April 26, 1955

R. BACCHI 2,706,996

FREE DISCHARGE VALVE

Filed Nov. 9, 1951

INVENTOR.
RAY BACCHI
BY
ATTORNEY

April 26, 1955
R. BACCHI
2,706,996
FREE DISCHARGE VALVE
Filed Nov. 9, 1951
2 Sheets-Sheet 2
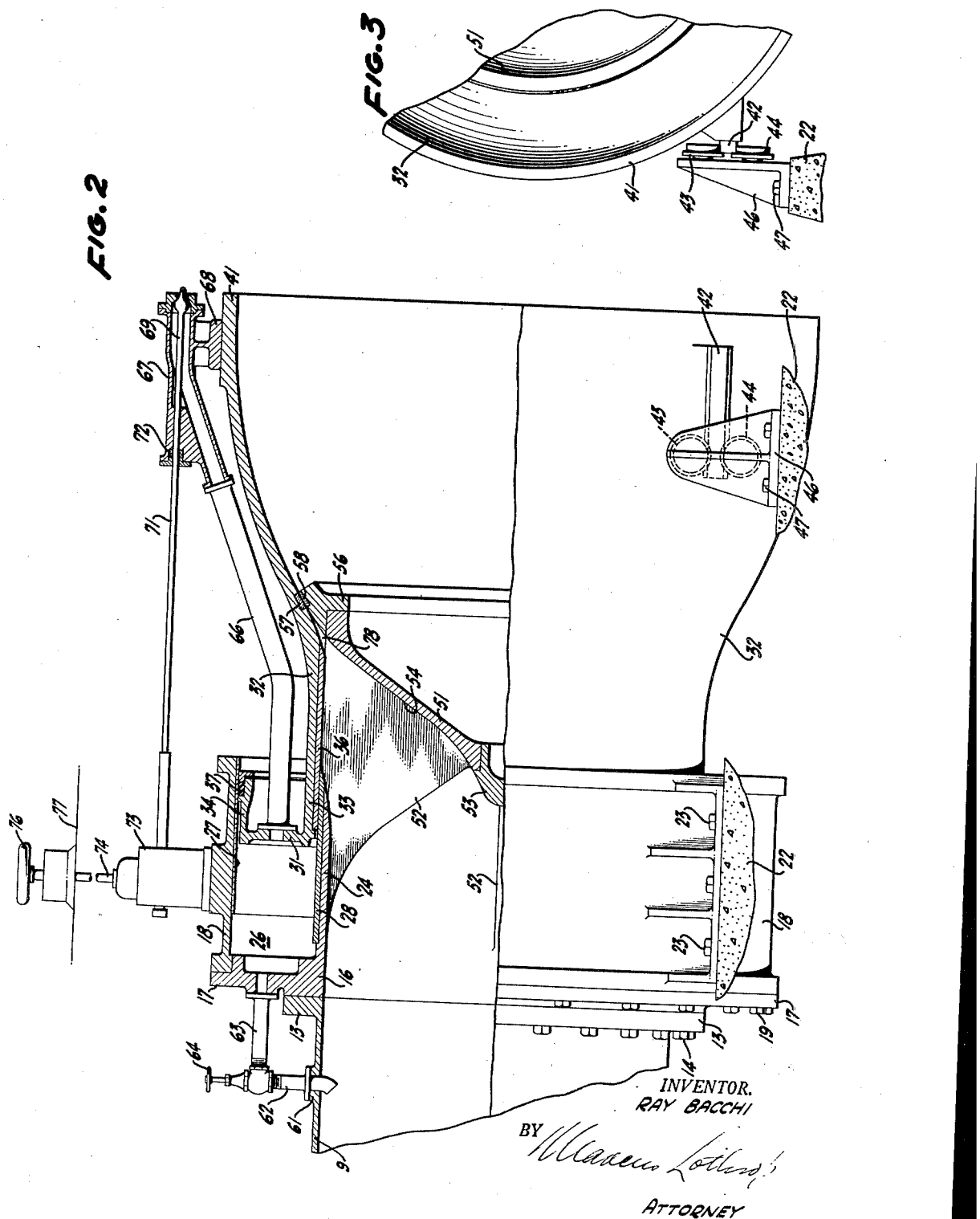
INVENTOR.
RAY BACCHI
ATTORNEY

United States Patent Office 2,706,996
Patented Apr. 26, 1955

2,706,996

FREE DISCHARGE VALVE

Ray Bacchi, Daly City, Calif., assignor to The Pelton Water Wheel Company, San Francisco, Calif., a corporation of California Application November 9, 1951, Serial No. 255,718

4 Claims. (Cl. 137—219)

My invention relates to valves primarily for use at the end of conduits, especially conduits of very large size, for satisfactorily discharging large quantities of water into the atmosphere and also having the capability of stopping discharge of water from the conduit. Valves of this type are customarily utilized in connection with reclamation and flood control projects as overflow or level regulators in connection with large dams. The requirements are not only for an accurate and precise control of the rate of discharge but likewise for mechanism operating positively and well under extreme and adverse conditions. The size of the valves is usually so large that the design must take into account various hydraulic phenomena that are not particularly noticeable in small size valves.

It is therefore an object of my invention to provide a free discharge valve effective to control the quantity of flow from a conduit into the atmosphere.

Another object of my invention is to provide a free discharge valve including suitable structure for opening and closing the valve positively under operating conditions.

A still further object of my invention is to provide a free discharge valve in which the water flow through the valve is of a satisfactory nature.

A still further object of the invention is to provide a free discharge valve which can be closely regulated to govern the rate of fluid discharge through it.

A still further object of the invention is to provide a free discharge valve which can be installed in a generally horizontal position and can readily be worked despite the size and massiveness of the moving parts.

An additional object of the invention is in general to improve free discharge valves.

Other objects, together with the foregoing, are attained in the embodiment of my invention described in the accompanying description and illustrated in the accompanying drawings in which:

Figure 1, in the lower half, is a side elevation in open position of a free discharge valve constructed in accordance with my invention and, in the upper half, is a cross section on a vertical plane through my free discharge valve, certain portions being broken away to reduce the size of the figure.

Figure 2 is a view comparable to Figure 1 but showing the free discharge valve in closed position.

Figure 3 is a fragmentary end elevation showing a supporting rail and attendant structure utilized in connection with the discharge bell.

Figure 1:
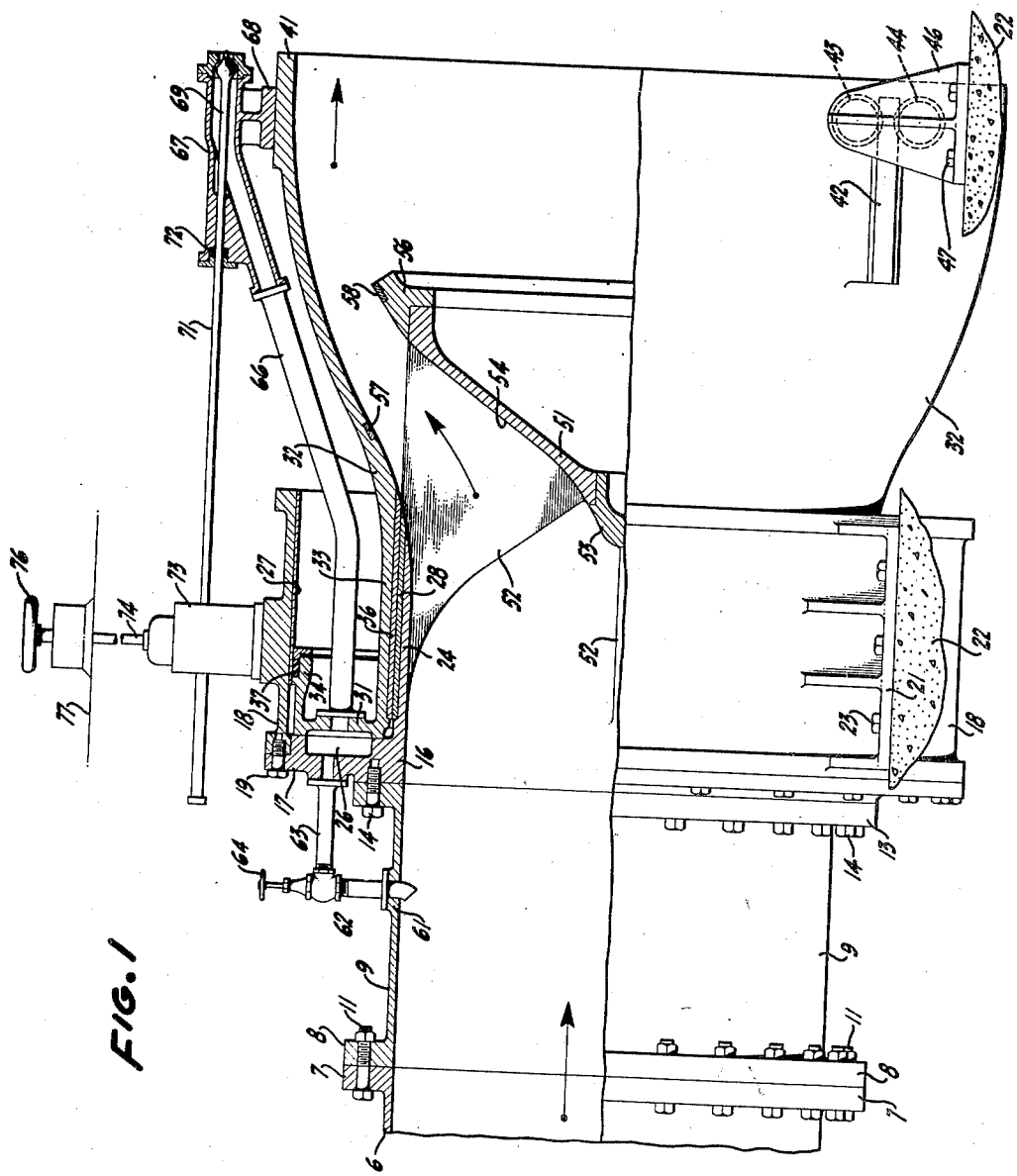

While the free discharge valve of my invention can be incorporated in a number of different ways and can be varied in its details depending upon its environment and upon special operating factors, it has been successfully incorporated in the form shown herein. This involves an installation at the end of a relatively large pipe 6 connected to a source of water under pressure, not shown. The pipe 6 is generally horizontal and terminates in a bolting flange 7 to which the flange 8 of a transition section 9 is secured by fastenings 11. The transition section itself is provided with a terminal flange 13 secured by bolts 14 to a conduit 16 having an internal diameter substantially the same as that of the transition section and of the pipe 6.

The conduit 16 is provided at its upstream end with a radially outward extending flange 17 to which an outer circular cylindrical shell 18 is secured by suitable fastening studs 19. At appropriate points on its exterior, the shell 18 is provided with supporting foot flanges 21, resting upon a foundation 22 which supports the entire structure, the conduit shell being held in position by fastenings 23. The shell 18 encompasses and is spaced from the interior conduit 16, the circular cylindrical wall 24 of which is substantially coaxial with and of the same axial extent as the shell 18. Thus, the shell and the wall 24 together define an annular chamber 26. Since the chamber 26 for much of its length is utilized as a cylinder, the shell 18 on its inner surface is provided with a circular cylindrical lining 27 whereas the circular cylindrical outer surface of the wall 24 is similarly provided with a bearing 28.

Slidably disposed with respect to the shell and the wall and reciprocable within the chamber 26 is a piston 31 formed as part of a discharge bell 32. The piston 31 is annular in configuration and is provided with an inner tube 33 and an outer skirt 34. Bearing material 36 is disposed on the interior of the tube 33 whereas packing 37 is situated on the exterior of the skirt. The piston and the remainder of the discharge bell 32 are reciprocable in a predetermined, rectilinear direction from a left hand extreme position, as shown in Figure 1, into a right hand extreme position, as shown in Figure 2.

The shape of the discharge bell 32 is such that in its open or left hand extreme position the interior contour of the conduit 16 gradually enlarges from its minimum diameter and through a smooth streamlined surface and a gradually enlarging diameter to become a maximum at the discharge lip 41 of the diffusing bell. When the bell is in open position there is consequently provided a smooth streamlined exterior envelope for the discharging fluid.

To assist in supporting the weight of the discharge bell 32, part of which is borne by the conduit 16, particularly the wall 24 and partly on the shell 18, there are provided at appropriate lower points on the outside of the bell 32 adjacent the lip 41 one or more, preferably a pair, of symmetrically disposed rails 42 aligned in the general direction of the discharge bell. These rails are designed to operate between flanged wheels 43 and 44, rotatably mounted on brackets 46 upstanding from the foundation 22 and secured thereto by removable fastenings 47. The weight of the diffusing bell is evenly borne so that the bell is easily moved to and fro in an axial direction despite its large size and great weight.

Pursuant to my invention, I provide means for utilizing the discharge bell as a part of a valving mechanism for controlling and for stopping the discharge of liquid and in addition for providing a discharge stream which is not solid but rather is hollow or is annular in cross section. To that end a baffle 51 is disposed at a location axially in alignment with the conduit 16 but with all parts of the baffle spaced from the walls of the conduit and with the diameter of the baffle considerably greater than the interior diameter of the conduit. The baffle is supported by a spider 52 comprised of a plurality of webs that extend from the baffle to the interior of the conduit 16 and merge with the wall 24. If convenient, the conduit 16, the spider 52 and the baffle 51 are all fabricated as one member, but in some instances these portions are separately fabricated and are then secured together. The baffle 51 on its upstream face is provided with an inserted streamlined nose 53 of wear-resistant material for dividing the previously solid stream. The flow is over the interior streamlined surface 54 of the baffle in directions diverging toward the interior surface of the discharge bell. The area for fluid flow is maintained substantially constant but, even around its outermost portion is provided with a wear-resistant ring 56 also diverging outwardly toward the diffusing bell and disposed in the path of travel of the bell.

When the diffusing bell 32 closes, it abuts the baffle 51 in its extreme position. The contours of the interior surface of the diffusing bell and of the exterior surface of the baffle are such that these members do not physically come into contact except at an interior annular seat 57 inset into the material of the discharge bell and at a second seat 58 inset into the material of the baffle 51. The diameter of the two abutting annular seats is greater than the diameter of the conduit 16 and also is greater than the diameter of the outside of the bearing 28. Preferably, the seats 57 and 58 are fabricated of separate pieces of wear-resistant metal, although the seats can be simply specialized areas on the discharge bell and on the baffle itself.

The contour surfaces extending from the abutted seats 57 and 58 on the upstream side of the conduit 16 are entirely open to hydraulic liquid under pressure. The seats 57 and 58, whether separate parts or not, are the only parts of the discharge bell and of the baffle which come into physical contact to prevent liquid flow.

In accordance with my invention, I provide means for moving the discharge bell between the extreme left hand position of Figure 1 and the extreme right hand position of Figure 2 under power. Preferably the pressure difference existing between the pressure liquid within the pipe 6 and the atmosphere is utilized for this purpose. Accordingly, the transition section 9 is provided with a boss 61 serving as an inlet mount for a pipe 62 having a section 63 leading into the chamber 26 and having a control valve 64 interposed in it. When the control valve 64 is in open position or nearly open position, liquid within the pipe 6 and in the transition section is free to flow into the chamber 26. It exerts its full pressure against the upstream face of the piston 31 therein unless it has some egress to the atmosphere. Such an exit is provided by a duct 66 joined to the piston 31 and extended to a discharge nozzle 67 mounted on a bracket 68 secured to the downstream edge 41 of the discharge bell. A movable nozzle needle 69 disposed within the nozzle has a stem 71 passing through appropriate packing 72 into a housing 73 upstanding from the outer shell 18. A control rod 74 rises from the housing 73 to a hand valve 76 at an appropriate location, for example on the floor 77 of a power house or flow control station.

When the nozzle needle 69 is in open position, any liquid which enters the pipe 62 and the chamber 26 is free to discharge to the atmosphere through the housing 67 so that no substantial pressure builds up within the chamber 26. When the nozzle needle 69 is closed, there is no escape from the chamber 26 and pressure fluid from the transition section 9 flows into the chamber 26, thus moving the piston 31 toward closed position. The arrangement constitutes a hydraulic jack to translate the discharge bell axially toward the right causing the seat 57 to approach and eventually to abut the seat 58 in its path. The valve in its closed position is illustrated in Figure 2.

Since the interior surface of the discharge bell upstream of the seat 57 and the surface of the baffle upstream of the seat 58 are spaced apart, there is in effect a chamber 78 defined between them in communication with the interior of the conduit 16. This chamber has a substantial projected area perpendicular to the axis of motion and subject to the pressure of the contained liquid. This pressure urges the discharge bell toward open position, and is resisted only by the pressure within the chamber 26. Consequently, when the valve 64 is throttled and the nozzle needle 69 is open so that flow into the chamber 26 is less than flow out of it, then the chamber 26 in effect discharges or can be discharged under a superior force. That superior force results from the pressure of the contained liquid against the projected area of the chamber 78 and the interior of the discharge bell. Due to resistance to hydraulic flow, the pressure of the liquid within the mechanism is greater than the atmospheric pressure outside of it.

The effect of the interior pressure upon the surface band within the discharge bell between the seat 57 and the lining 36 is sufficient to overcome resistance to outflow of liquid from the chamber 26 when the nozzle is open. The discharge bell is therefore translated to the left from closed position toward and into open position. When the discharge valve opens there is some pressure drop from the presusre existing under closed conditions, but there is still sufficient pressure remaining to complete the motion of the mechanism.

By appropriately regulating the valve 64 to a set value and then by opening the nozzle needle 69 to an extent greater than that or to an extent less than that, the discharge bell can be moved to and fro to regulate the degree of opening of the structure. Actually, the arrangement is such that an automatic regulation takes place. For example, if the discharge bell is too far open for the setting established by the hand wheel 76, the pressure tending to open the discharge bell is overcome by the continued increase of pressure fluid within the chamber 26 which enters through the valve 64 faster than it can escape through nozzle body 67.

Due to the increased pressure in the chamber 26, the discharge bell translates toward the right in Figure 1. This not only closes the opening between the baffle and the discharge bell but simultaneously moves the casing 67 to the right and farther away from the nozzle needle 69, thereby affording a greater opening for the discharge of liquid at that point. The augmented discharge of liquid reduces the pressure within the chamber 26 and permits the pressure acting upon the discharge bell adjacent to the seat 57 to urge the discharge bell toward open position again. The system can hunt in the described directions but in the usual instance there is sufficient frictional drag in all of the mechanisms so that a desired, substantially stable position between the extremes is achieved by the discharge bell acting as valve and in response to a selected position set up by the hand wheel 76.

In the event of failure of the mechanism; that is, in the event an emergency condition arises, it is merely necessary to close the hand valve 64 whereupon the pressure of the water within the pipe 6 and within the conduit 16 is effective to translate the discharge bell into its fully open position, thus affording a free discharge of the contained liquid. Because of the location of the streamlined baffle within the interior of the discharge bell and because of the careful contour of the interior of the bell and the exterior of the baffle, the stream discharging from the valve is a shell annular in cross section or is a hollow stream with an air core so that the discharged water stream tends to disrupt and not to flow for any great distance.

What is claimed is:

1. A free discharge valve comprising a conduit having an open end and a cylindrical outer wall, a flange extending from said conduit, a shell supported on said flange and having a cylindrical inner wall overlying said outer wall to leave an annular chamber therebetween, an annular piston slidable on said walls and reciprocable in said chamber, a discharge bell extending from said piston and reciprocable therewith, a baffle spanning the open end of said conduit, a spider supporting said baffle on said conduit at a distance from the end thereof to leave an annular space therebetween, a first seat on said baffle in the path of said bell, a second seat on said bell adapted to abut said first seat during reciprocation of said bell, a pipe for conducting actuating fluid from said conduit to said chamber, a duct on and movable with said bell for conducting actuating fluid out of said chamber, a control valve in said duct, and means connected to a stationary part of said free discharge valve for operating said control valve.

2. A free discharge valve having all parts disposed upstream of the lip of a discharge bell comprising a conduit having an open end and a cylindrical outer wall, a flange extending from said conduit, a shell supported on a foundation and coupled to said flange and having a cylindrical inner wall overlying said outer wall to leave an annular chamber therebetween, an annular piston slidable on said walls and reciprocable in said chamber in a predetermined axial direction, a discharge bell extending from said piston and reciprocable therewith, a baffle spanning the open end of said conduit, a spider supporting said baffle on said conduit at an axial distance from the end thereof to leave an annular space therebetween, mutually abutting valve seats on said baffle and on said bell, said bell having an axially extended portion overlying said baffle in all reciprocated positions of said bell, rails on the exterior of said extended portion of said bell, said rails extending in said predetermined axial direction, and means on said foundation beyond the end of said baffle for engaging said rails for supporting said bell during reciprocation thereof.

3. A free discharge valve having all parts disposed upstream of the lip of a discharge bell comprising a conduit having an open end, a baffle of larger diameter than said conduit mounted on said conduit at a distance from and spanning said end, a discharge bell having one portion encompassing and slidable on the outside of said conduit and flaring into another portion of greater diameter than said baffle and extending axially beyond said baffle in all slidable positions of said discharge bell, means for sliding said discharge bell on said conduit into and out of abutment with said baffle, rails on the exterior of the portion of said discharge bell of greater diameter, said rails in all positions of said discharge bell being axially beyond said baffle, and wheels in a fixed position relative to said conduit and axially beyond said baffle for engaging said rails to assist in supporting said discharge bell in all positions thereof.

4. A free discharge valve comprising an axially extending conduit having an open end and a cylindrical outer wall, a flange extending from said conduit, a shell supported on said flange and having a cylindrical inner wall overlying said outer wall to leave an annular chamber therebetween, a baffle axially spaced from and spanning the open end of said conduit, said baffle terminating in a diameter greater than that of said open end, a spider supporting said baffle on said conduit, an annular piston axially slidable on said walls in said chamber, a discharge bell joined to and extending from said piston, said discharge bell having one portion slidable on said inner wall and flaring into a second portion terminating in a substantially cylindrical lip and extending axially to overlie said baffle in all positions of said discharge bell, a pipe for conducting actuating fluid from said conduit into said chamber, a duct opening through said piston and extending from said chamber to the atmosphere, a control valve in said duct, and means responsive to the axial position of said discharge bell for operating said control valve.

References Cited in the file of this patent

UNITED STATES PATENTS

| | | |
|---|---|---|
| 1,597,371 | Gfeller | Aug. 24, 1926 |
| 2,010,416 | Schlagenhauff | Aug. 6, 1935 |
| 2,416,787 | White | Mar. 4, 1947 |